INVENTOR.
GLENN A. MARSH
BY
ATTORNEY 3,192,473
METHOD AND APPARATUS FOR DETECTING CHANGES IN COMPOSITION OF LIQUID FLOWING THROUGH A PIPE LINE
Glenn A. Marsh, Crystal Lake, Ill., assignor to The Pure Oil Company, Chicago, Ill., a corporation of Ohio
Filed Dec. 5, 1960, Ser. No. 73,735
13 Claims. (Cl. 324—61)

This invention relates to new and useful improvements in apparatus and methods for detecting a change in composition in a liquid flowing through a pipe line, and more particularly to an apparatus and method for detecting the passage of a liquid interface past a given point in the line. The method and apparatus of this invention is especially useful in detecting the interface between liquids having closely similar properties.

In transporting crude oils and various refined petroleum products through pipe lines, it is common to introduce different fluids consecutively into a pipe line for transportation to a remote point. It has been found that different petroleum products can be transported consecutively through pipe lines with very little mixing occurring at the interface between the fluids. However, it is essential that some means be provided for indicating the position of the interface between different liquids so that the arrival of the interface at a terminal or pumping station may be known with considerable accuracy, and thus permit segregation of the fluid into distinct batches with a minimum amount of intermixing. In some cases, the detection of the fluid interface can be accomplished by measurement of a distinctive physical property, such as vapor pressure, where fuel oil and gasoline are being transported in the same line. However, it has been difficult to detect the interface between similar fluids, such as different types of gasoline flowing in a pipe line. If apparatus is available which provides a high degree of reliability and sensitivity to detect the difference between fluids flowing in a pipe line, it is possible to use automatic equipment for operating valves, starting pumps, etc. in operating the pipe line.

In the past, a variety of measuring devices has been used for detecting impurities in fluids flowing in a pipe line, and these have been used to a limited extent in attempts to detect the presence of a liquid interface in a pipe line. One such apparatus measures the change in density of a liquid in a pipe line by measuring the amount of radioactive energy passed through a pipe line from a standard source of radioactive material. A measuring cell converts the radioactive energy into electrical energy which is converted, amplified, and fed to a recorder as a positioning signal. This apparatus has the disadvantages of high cost, dangers inherent in handling radioactive material, and the necessity for calibration of the instrument for various pipe-wall thicknesses and for different materials transported in the pipe line. Another instrument which has been used in an attempt to determine the liquid interface in a pipe line has been the automatic gravitometer. This instrument continually weighs the product in a by-pass on the pipe line, and the interface is determined by an abrupt change in specific gravity of the liquid. This instrument, however can not discern between products having the same specific gravity and has a low degree of accuracy. Various laboratory apparatus, such as the colorimeter and instrument for measuring refractive index, have been used on an experimental scale, but have not proved suitable for field installation. The most promising instruments used in detecting changes of liquid composition, and which are especially adaptable to the detection of liquid interface, are measuring instruments which detect a change in an electrical property of the liquid flowing in the pipe line. While some use has been made of the measurement of electrical resistance of fluids in a pipe line, the most widely used instruments are those which measure changes in capacitance resulting from changes in fluid composition. Some major electrical-instrument companies have introduced capacitance analyzers for use in monitoring liquid flow in pipe lines. A capacitance analyzer, however, is subject to the disadvantage that significant changes in dielectric constant occur within a single batch of fluid which may make the detection of a liquid interface more difficult.

It is therefore one object of this invention to provide new and improved apparatus and methods for detecting a change in composition in a liquid flowing through a pipe line.

Another object of this invention is to provide an improved method and apparatus for detecting the passage of a liquid interface in a pipe line.

A further object of this invention is to provide an improved apparatus and method for detecting the interface between two liquids having very similar compositions.

A feature of this invention is the provision of an improved method for detecting change in composition of a liquid flowing through a pipe line in which a portion of the liquid is retarded in rate of flow relative to the rest of the liquid stream, and a physical property of each portion of the stream is measured so that a simultaneous measurement of substantially different properties indicates a marked change in liquid composition, or a change from one liquid to another in the line.

Another feature of this invention is the provision of apparatus in which a fluid flowing through a pipe line is divided into two streams and one stream is passed into a hold-up chamber to delay the rate of flow relative to the main liquid stream, and a physical property of each stream is measured and compared so that simultaneous measurement of substantially different properties indicates the passage of a liquid interface.

Other objects and features of this invention will become apparent from time to time throughout the specification and claims as hereinafter related.

In general, this invention is based on detecting and comparing the levels of a selected property of fluids flowing past two spaced positions in a pipe line. Dissimilarities in levels of the property measured at these two points are indicative of the presence of a liquid interface between the two points. However, differences in temperature at the two points can cause erroneous comparisons of the levels of the properties. Long electrical leads likewise can introduce stray signals which may affect the accuracy of measurements. To overcome these problems, I divide the flowing pipe line liquids into two parallel streams, delay the flow of liquid constituting one of the parallel streams by use of a hold-up chamber, and compare the levels of a property in the delayed and undelayed streams at adjacent points in the streams. When a liquid interface passes through the apparatus, it arrives at a sensing point in the undelayed stream before it arrives at the sensing point in the delayed stream, thereby creating a detectable difference in the property being measured in the two streams. This method and apparatus has the additional advantage of providing a measurement of a property simultaneously in two distinct fluids and thus avoids the danger of a false indication of a liquid interface which might occur due to variation in properties of the fluid flowing in the line. Indication of differences in properties between the two streams is made by suitable measuring means which may actuate a recorder or indicator to give a viusal manifestation of the difference in properties, or may automatically actuate a controller to start or stop a pump, or open or close a valve to automatically control the flow of liquid and automatically direct its course to a desired location. In the measurement of properties of the liquid flowing in the pipe line or in the two branches into which the liquid flow is divided, any property of the liquid may be used as a basis for indication of change in composition. The color, dielectric strength, electrical resistance or capacity, density, viscosity, etc., may be measured in each of the branches of liquid flowing in the apparatus to determine change in liquid composition or the passage of the liquid interface. In each case, the property measured is converted into an electrical signal which is fed into a suitable measuring circuit and amplifier, and passed to the recorder, indicator, or controller for measuring, indicating, or altering the flow of the main liquid stream in response to the changes in the liquid property being measured.

Figure 1:
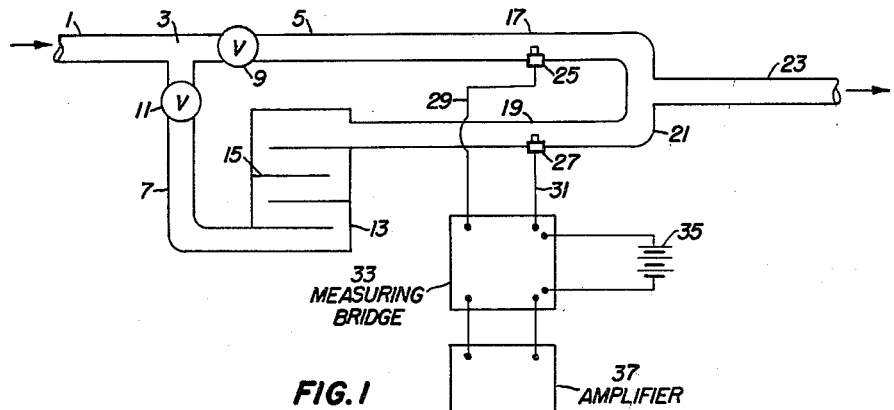
FIG. 1 illustrates one embodiment of a parallel channel interface detecting apparatus.

In FIGURE 1 of the drawing, there is shown a preferred embodiment of this invention. In FIG. 1, pipe line 1 is split by means of T3 into branches 5 and 7. In branches 5 and 7, there are provided throttling valves 9 and 11 which function as adjustable orifices to control the relative flow rates in each branch. Branch 7 leads to enlarged section or hold-up chamber 13 which produces a predetermined delay in the flow of liquid in branch 7 relative to liquid flowing in branch 5. Hold-up chamber 13 may be provided with a plurality of baffles 15, which minimize mixing of successive batches of liquid in the hold-up chamber. The liquid flowing through branch 5 at point 17 is therefore a known distance ahead of the liquid flowing through branch 7 at point 19. This distance is determined by the size of the hold-up chamber 13. Beyond points 17 and 19, branches 5 and 7 rejoin at connector 21 and flow through line 23. At points 17 and 19, there are provided sensing means or probes 25 and 27, which may determine the color, dielectric strength, resistance or capacity, density, viscosity, or any other physical or chemical property of the liquids in branches 5 and 7. For maximum accuracy, it is preferred to utilize several different types of sensing means at each of the locations.

Figure 4:
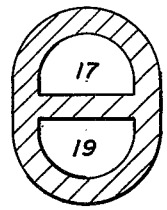
FIG. 4 is a sectional view taken on line 4—4 of FIG. 3.
Figure 3:
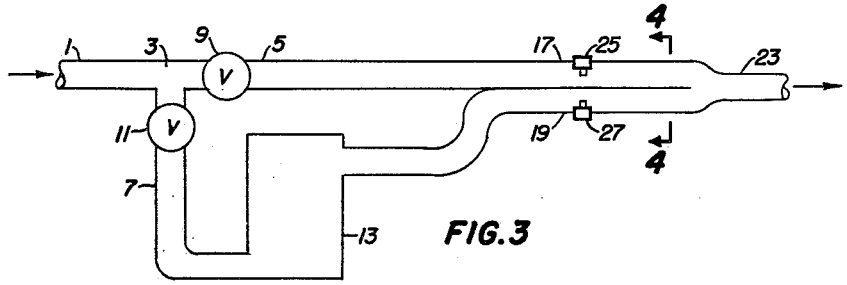
FIGS. 3 and 5 are alternate embodiments of the device illustrated in FIG. 1.

Branches 5 and 7 are located close to each other to minimize temperature differences between the liquids in contact with sensing means 25 and 27. In fact, a preferred arrangement of this apparatus utilizes a pair of conduits having a common wall, as shown in FIGS. 3 and 4 of the drawing (FIG. 4 being a section on the line 4—4 of FIG. 3).

Figure 2:
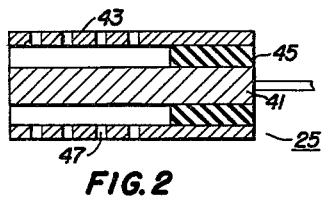
FIG. 2 illustrates a capacitive probe.

The sensing means, or probes, 25 and 27 are preferably connected by wires 29 and 31 to a measuring bridge circuit 33 of conventional design which may be supplied with electric power from source 35. Bridge circuit 33 is connected to amplifier 37 which is in turn connected to a recorder, indicator, or controller 39 of conventional construction. In a preferred form of the invention, probes 25 and 27 are capacitor probes of the type described in Patents 2,720,624; 2,623,928; 2,960,949; 2,654,067; or 2,783,420. The capacitor probes, as shown in FIG. 2, may consist simply of an inner electrode 41 and an outer sleeve electrode 43 separated by insulator 45. Outer sleeve 43 is preferably perforated with a plurality of holes 47 to provide for flow of liquid freely between the electrodes. The capacitor probes 25 and 27 are normally inserted through suitable openings into branch lines 5 and 7 and are connected by a co-axial connector (not shown) to lines 29 and 31 which, in this embodiment, are co-axial cables. Capacitor probes 25 and 27 are thus connected into two legs of a bridge circuit, the other two legs of which may include balanced resistors. Probes 25 and 27 are balanced against each other and no current or potential is applied from bridge circuit 33 to amplifier 37 as long as the same homogenous liquid is present in both branches. As an interface passes through the apparatus, it arrives at point 17 in branch 5 before it arrives at point 19 in branch 7, and thereby unbalances the measuring bridge 33 and applies a signal to amplifier 37, which then actuates the recorder or indicator 39 to signal the passage of the interface. If desired, recorder or indicator 39 may be replaced by a suitable controller, which is actuated by the signal from bridge circuit 33 and amplifier 37, and actuates a control valve or the control circuit for the pump or valve to either stop or divert the flow of liquid.

As was pointed out above, one of the objects of this apparatus is to provide an arrangement in which measurement of a liquid property is made in two liquid streams which are positioned closely adjacent to each other so that the measurements are taken at substantially the same temperature. In FIG. 1, parallel or branch lines 5 and 7 are positioned in relatively close physical relation at the point of measurement with the probes 25 and 27. In FIG. 3, part of the conduits forming branch lines 5 and 7 consist of a single member having a common wall positioned so that the two branches of liquid flow are maintained in intimate heat-exchange relation. The type of conduit used in this arrangement is illustrated more clearly in the sectional view shown in FIG. 4. The parts of the apparatus and their operating relation in FIGS. 3 and 4 are otherwise the same as in FIG. 1.

Figure 5:
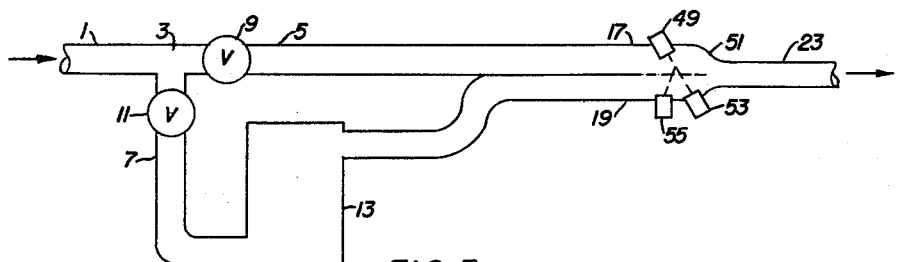

In FIG. 5, there is shown an alternate embodiment of the invention using the conduit having a common wall between parallel branches 5 and 7. In this embodiment of the invention, the measuring probes are replaced by light source 49 which is arranged to project a beam of light across the conduit at the enlarged position 51 where lines 5 and 7 rejoin the main conduit 23. Light from source 49 is directed to photocell 53 which is connected to a conventional indicating circuit and indicates that the light is on. Photomultiplier 55 is positioned out of the path of light from source 49 and is not normally activated. As long as materials of the same composition and density are passing through branch lines 5 and 7, the light from source 49 is not appreciably refracted toward photomultiplier 55. However, when materials of different composition, and particularly of different refractive index, appear in branches 5 and 7 as a result of delay in emptying hold-up chamber 13, light from source 49 is refracted and activates photomultiplier 55. Photomultiplier 55 is connected to a suitable indicating or control circuit which activates an indicator, or control valve or pump, in response to the passage of the liquid interface through the apparatus.

While this invention has been described with emphasis upon two preferred embodiments, it should be noted that the apparatus may be modified by substituting any suitable indicator for probes 25 and 27 to indicate electrically a variation in a property (either physical or chemical) of the liquid passing through the apparatus. It should be understood, therefore, that within the scope of the appended claims, this invention may be practiced otherwise than as specifically described herein.

The embodiments of the invention in which an exclusive property or privilege is claimed are defined as follows:

1. A method for detecting a change in composition in a liquid flowing through a pipe line, which comprises dividing the flowing liquid into two streams and subsequently re-uniting said streams in said pipe line, passing one liquid stream through reservoir means and thus retarding the rate of flow of said one liquid stream relative to the other, and simultaneously measuring a property of each stream at substantially adjacent positions, whereby the difference in values of the property measured in the liquid streams at the same time indicates a change in liquid composition in that region of the pipe line.

2. A method in accordance with claim 1 in which two different liquids are flowing successively in the pipe line and the detection of different values simultaneously in said liquid streams indicates the passage of the interface between said liquids.

3. A method in accordance with claim 1 in which the liquid streams are positioned in close physical relation so that the measurement of liquid properties is substantially at the same temperature.

4. A method in accordance with claim 1 in which the properties of said liquids are measured electrically, and any difference in values is indicated by imbalance of an electrical measuring circuit.

5. A method in accordance with claim 4 in which the dielectric constant of the liquid is measured by a plurality of capacitive probes.

6. Apparatus for detecting change in composition of liquid flowing through a pipe line consisting of a pair of parallel conduits in liquid communication with said line, means connected to one of said conduits for producing a predetermined delay in flow therethrough of liquid having its original composition as compared to flow of liquid of the same composition through the other conduit, throttling valves in the upstream end of said branches, and means for detecting a difference in the same physical property of the liquid, in each of said conduits at substantially the same point downstream of said means for producing delay in flow of liquid whereby said difference indicates a change in liquid composition passing through said pipe line.

7. An apparatus in accordance with claim 6 in which the conduits are positioned in close physical relation adjacent to said detecting means so that measurement of said liquid property is at substantially the same temperature.

8. An apparatus in accordance with claim 7 in which said conduits adjacent to said detecting means are physically joined and have a common dividing wall.

9. An apparatus in accordance with claim 6 in which said detecting means comprises a plurality of probes for measuring an electrical property of the liquid, said probes being operatively connected in an electrical control circuit which is actuated in response to passage of a liquid interface through said apparatus.

10. An apparatus in accordance with claim 9 in which the probes are capacitive probes which measure change in dielectric constant of the liquid.

11. An apparatus in accordance with claim 6 in which said detecting means comprises a light source and photoelectric means positioned to measure change in refraction of light passing through the liquid in each of said conduits.

12. An apparatus in accordance with claim 6 in which said parallel conduits are reconnected to the pipe line downstream from said delay-producing means and said detecting means comprises a light source and photoelectric means positioned at the point of reconnection to measure change in refraction of light passing through the liquid at the point where the parallel streams rejoin.

13. An apparatus in accordance with claim 6 in which said means for producing a predetermined delay in flow of liquid is a reservoir, said detecting means comprises a plurality of conductive electrical probes, and said probes are operatively connected to an electrical control circuit which is actuated in response to a change in composition of liquid at said point.

References Cited by the Examiner

UNITED STATES PATENTS

| | | | |
|---|---|---|---|
| 2,200,863 | 5/40 | Schuck | 324—61 |
| 2,577,612 | 12/51 | Fay | 324—61 |
| 2,599,583 | 6/52 | Robinson et al. | 324—61 |
| 2,906,949 | 9/59 | Shawhan | 324—61 |

FOREIGN PATENTS 396,529  6/24  Germany.

WALTER L. CARLSON, *Primary Examiner.*

SAMUEL BERNSTEIN, *Examiner.*